US011842480B2

(12) United States Patent
Matsubara

(10) Patent No.: US 11,842,480 B2
(45) Date of Patent: Dec. 12, 2023

(54) APPARATUS, METHOD, AND STORAGE MEDIUM

(71) Applicant: CANON KABUSHIKI KAISHA, Tokyo (JP)

(72) Inventor: Mizuki Matsubara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 344 days.

(21) Appl. No.: 17/308,875

(22) Filed: May 5, 2021

(65) Prior Publication Data
US 2021/0358099 A1 Nov. 18, 2021

(30) Foreign Application Priority Data

May 14, 2020 (JP) ................................. 2020-085393

(51) Int. Cl.
G06T 7/90 (2017.01)
G06T 7/00 (2017.01)
(Continued)

(52) U.S. Cl.
CPC ............... *G06T 7/001* (2013.01); *G01J 3/10* (2013.01); *G06T 7/90* (2017.01); *H04N 13/133* (2018.05);
(Continued)

(58) Field of Classification Search
CPC . G06T 7/001; G06T 7/90; G06T 2207/10012; G06T 2207/10024; G06T 2207/10152; G06T 2207/30164; G06T 2207/30108; G06T 5/20; G06T 5/50; G06T 5/008; G01J 3/10; H04N 13/133; H04N 13/254; H04N 23/10; H04N 23/60; H04N 23/74
(Continued)

(56) References Cited

U.S. PATENT DOCUMENTS

2002/0003630 A1* 1/2002 Matama .................. G06F 18/00
358/1.9
2012/0274775 A1* 11/2012 Reiffel ................... G06Q 30/08
348/158

(Continued)

FOREIGN PATENT DOCUMENTS

JP 4217243 B2 1/2009

*Primary Examiner* — Ali Bayat
(74) *Attorney, Agent, or Firm* — CANON U.S.A., INC. IP Division

(57) ABSTRACT

An apparatus includes a first acquisition unit configured to acquire a target image and a first reference image in an environment in which a first light source and a second light source having temporally and spatially varying characteristics coexist, the target image being obtained by capturing an image of a target object, the first reference image being obtained by capturing images of reference charts arranged at a plurality of positions, a second acquisition unit configured to acquire a second reference image obtained by capturing images of the reference charts arranged at the plurality of positions under the first light source, and an estimation unit configured to estimate, based on the target image, the first reference image, and the second reference image, an image of the target object in a case where the image of the target object is captured under the first light source.

20 Claims, 7 Drawing Sheets

(51) Int. Cl.
*H04N 13/133* (2018.01)
*H04N 13/254* (2018.01)
*G01J 3/10* (2006.01)

(52) U.S. Cl.
CPC . *H04N 13/254* (2018.05); *G06T 2207/10012* (2013.01); *G06T 2207/10024* (2013.01); *G06T 2207/10152* (2013.01); *G06T 2207/30164* (2013.01)

(58) Field of Classification Search
USPC .......................................................... 382/165
See application file for complete search history.

(56) References Cited

U.S. PATENT DOCUMENTS

2020/0134773 A1\* 4/2020 Pinter ................. G01N 21/8806
2022/0026052 A1\* 1/2022 Keller .................. G02B 6/0095

\* cited by examiner

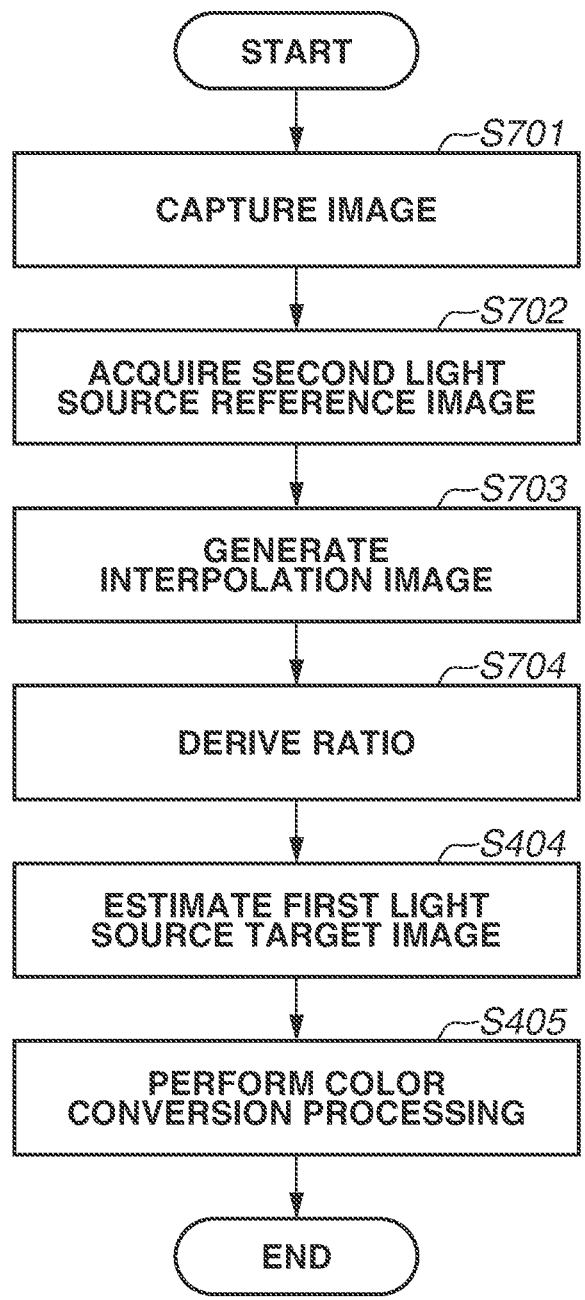

APPARATUS, METHOD, AND STORAGE MEDIUM

BACKGROUND OF THE DISCLOSURE

Field of the Disclosure

The aspect of the embodiments relates to a technique for processing an image obtained by image capturing.

Description of the Related Art

In manufacturing plants for industrial products, a color inspection for checking that manufactured products are painted with a uniform color is carried out. One example of such a color inspection is to check a color difference using image data obtained by capturing an image with an image capturing apparatus. In this case, the image data obtained by capturing an image with the image capturing apparatus can vary in color depending on characteristics of the image capturing apparatus and illumination conditions. The use of such image data with variation in color makes it difficult to perform a comparison. Thus, color conversion processing is performed on the image data so that colors in image data of objects of the same color are represented in colors as identical as possible.

A manufacturing plant in which the color inspection is carried out as described above may be designed so that the manufacturing plant is illuminated not only with light-emitting diode (LED) light from an LED lighting device placed indoors, but also with sunlight coming through a window, a product carry-in/carry-out port, or the like. Japanese Patent No. 4217243 discusses a technique for acquiring image data under different light sources and performing color conversion processing on the respective image data.

However, there is a light source, such as the sun, that has such characteristics that illumination conditions vary depending on a change in temporal or spatial conditions. If light from such a light source comes into the manufacturing plant, the illumination conditions such as spectral characteristics and illuminance can vary from place to place in the manufacturing plant. The illumination conditions can also vary depending on a change of an inspection time, season, weather, and the like. The method discussed in Japanese Patent No. 4217243 fails to consider variation in the illumination conditions due to a change in the temporal or spatial conditions of illumination. Therefore, it takes time and labor in dealing with such a change in the temporal or spatial conditions.

SUMMARY OF THE DISCLOSURE

According to an aspect of the disclosure, an apparatus includes a first acquisition unit configured to acquire a target image and a first reference image in an environment in which a first light source and a second light source having temporally and spatially varying characteristics coexist, the target image being obtained by capturing an image of a target object, the first reference image being obtained by capturing images of reference charts arranged at a plurality of positions, a second acquisition unit configured to acquire a second reference image obtained by capturing images of the reference charts arranged at the plurality of positions under the first light source, a deriving unit configured to derive a ratio between brightness of the first light source and brightness of the second light source at a position of the target object based on the first reference image and the second reference image, and an estimation unit configured to estimate, based on the target image and the ratio, an image of the target object in a case where the image of the target object is captured under the first light source.

Further features of the disclosure will become apparent from the following description of exemplary embodiments with reference to the attached drawings.

BRIEF DESCRIPTION OF THE DRAWINGS

FIG. 7 is a flowchart illustrating processing to be executed by the image processing apparatus according to the second exemplary embodiment.

DESCRIPTION OF THE EMBODIMENTS

Figure 1:
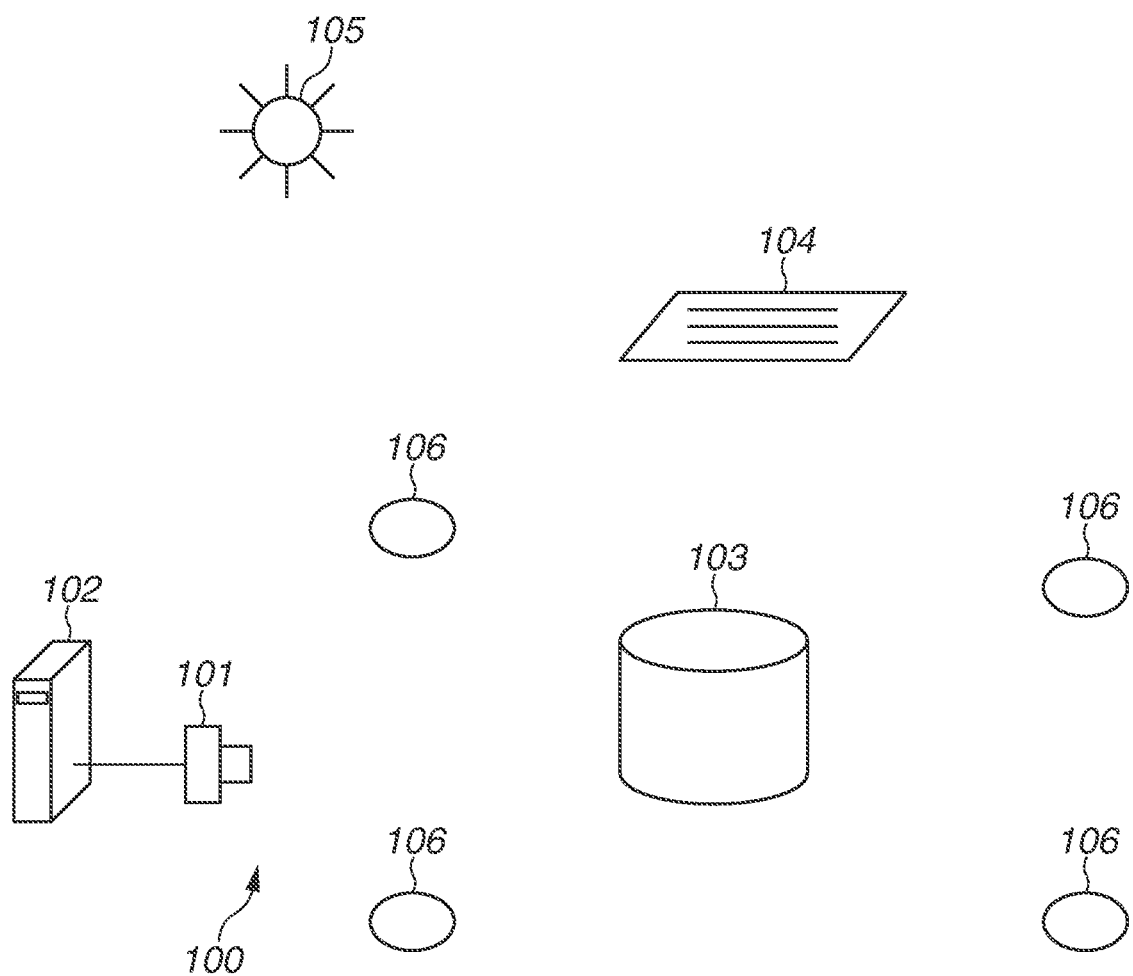
FIG. 1 is a diagram schematically illustrating a configuration of a color inspection system.

Exemplary embodiments of the disclosure will be described below with reference to the drawings. The following exemplary embodiments are not intended to limit the disclosure, and not all combinations of features described in the exemplary embodiments are essential to the disclosure. The same components are denoted by the same reference numerals.

<Configuration of Color Inspection System>

FIG. 1 is a diagram schematically illustrating a configuration of a color inspection system according to a first exemplary embodiment.

As illustrated in FIG. 1, a color inspection system 100 includes an image capturing apparatus 101, an image processing apparatus 102, a first light source 104, and a second light source 105.

The first light source 104 is an artificial light source such as a light-emitting diode (LED). The first light source 104 has characteristics that do not greatly vary temporally and spatially. The second light source 105 is a light source such as the sun. The second light source 105 has characteristics that temporally and spatially vary. In other words, the present exemplary embodiment illustrates an example where the color inspection system 100 is illuminated with light in an environment in which the first light source 104 and the second light source 105 having temporally and spatially varying characteristics coexist.

Reference charts 106 are placed at a plurality of positions. It may be desirable that each of the reference charts 106 be not much different from a color inspection target 103 in terms of geometric aspects. As each of the reference charts 106, for example, a white board having properties similar to those of a perfect diffuse reflection surface can be used.

<Hardware Configuration of Image Processing Apparatus>

Figure 2:
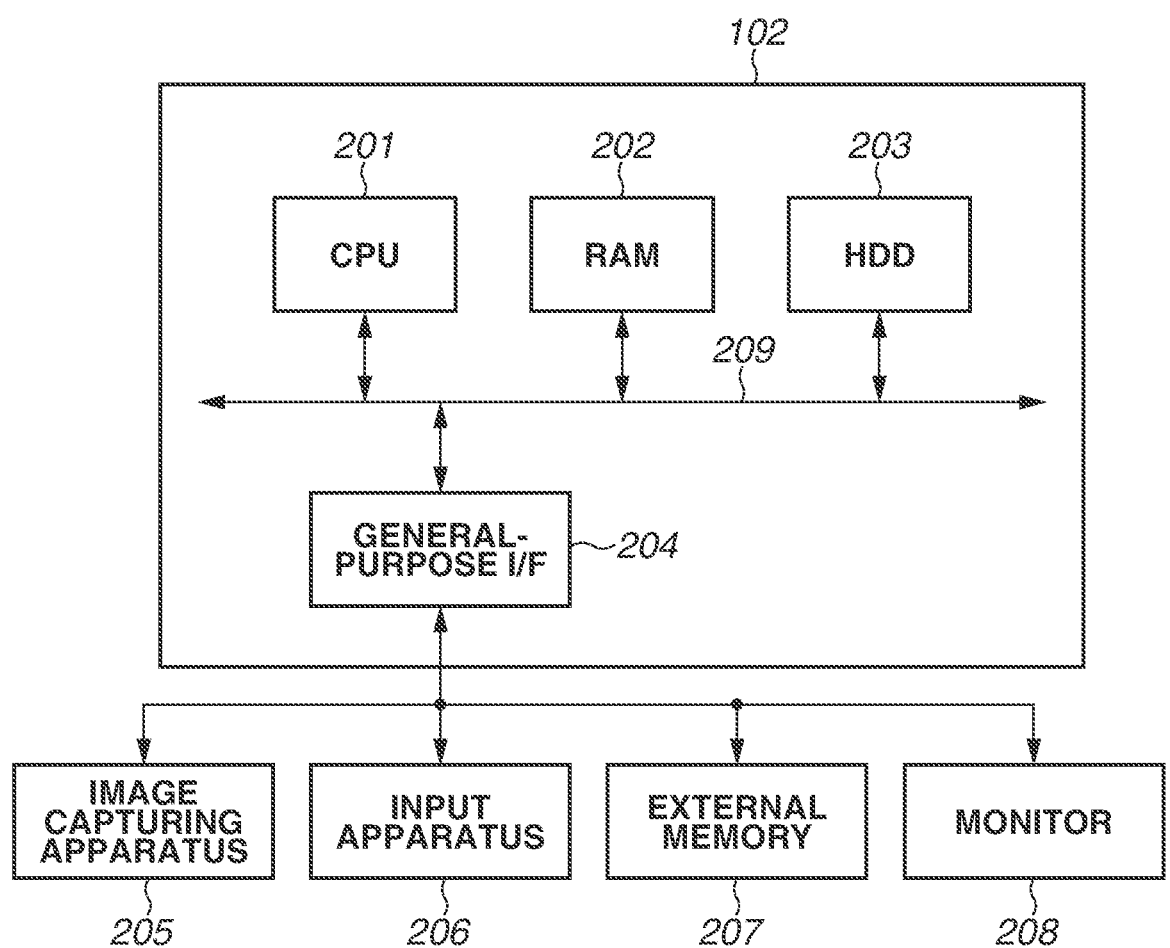
FIG. 2 is a block diagram illustrating a hardware configuration example of an image processing apparatus.

FIG. 2 is a block diagram illustrating a hardware configuration example of the image processing apparatus 102.

The image processing apparatus 102 includes a central processing unit (CPU) 201, a random access memory (RAM) 202, a hard disk drive (HDD) 203, a general-purpose interface (I/F) 204, and a main bus 209. The general-purpose I/F 204 connects an image capturing apparatus 205 (corresponding to the image capturing apparatus 101 illustrated in FIG. 1) such as a camera, an input apparatus 206 such as a mouse or a keyboard, an external memory 207 such as a memory card, and a monitor 208 to the main bus 209.

Various processing to be implemented by the CPU 201 causing various software components (computer programs) stored in the HDD 203 to operate will be described below.

First, the CPU 201 starts an image processing program (referred to as an image processing application) stored in the HDD 203, loads the image processing application into the RAM 202, and displays a user interface (UI) on the monitor 208. Next, the CPU 201 transfers various data stored in the HDD 203 or the external memory 207, image data obtained by capturing an image with the image capturing apparatus 205, and an instruction from the input apparatus 206 to the RAM 202. Then, the CPU 201 executes various arithmetic processing on the image data stored in the RAM 202 based on the image processing application. Then, the CPU 201 displays arithmetic processing results on the monitor 208, and stores the arithmetic processing results in the HDD 203 or the external memory 207.

Image processing in which the CPU 201 executes the image processing application to perform color conversion processing on image data in the above-described configuration will be described in detail.

<Functional Configuration of Image Processing Apparatus of First Exemplary Embodiment>

Figure 3:
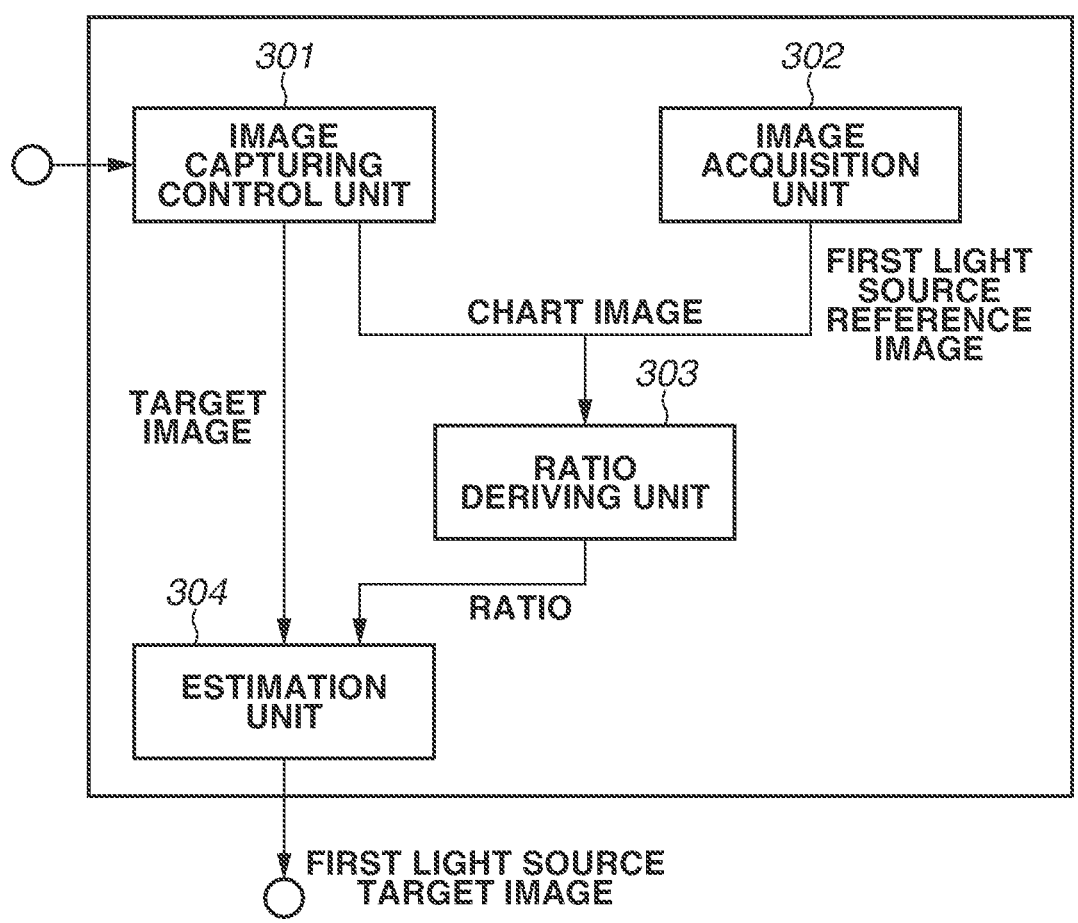
FIG. 3 is a block diagram illustrating a functional configuration of an image processing apparatus according to a first exemplary embodiment.

FIG. 3 is a functional block diagram illustrating a functional configuration formed by the CPU 201 executing the image processing application according to the present exemplary embodiment. Specifically, the CPU 201 uses the RAM 202 as a work memory to read the image processing application stored in the HDD 203 and executes the image processing application, thereby implementing a function of each processing unit illustrated in FIG. 3. The processing to be described below is not necessarily executed by the CPU 201, and the image processing apparatus 102 may be configured in such a manner that some or all of the processing is executed by one or more processing circuits other than the CPU 201.

As illustrated in FIG. 3, the CPU 201 executes the image processing application to thereby perform processing corresponding to each of an image capturing control unit 301, an image acquisition unit 302, a ratio deriving unit 303, and an estimation unit 304.

The image capturing control unit 301 controls the image capturing apparatus 205 (corresponding to the image capturing apparatus 101 illustrated in FIG. 1) to capture images of the color inspection target 103 and the reference charts 106 arranged at the plurality of positions. Specifically, the image capturing control unit 301 captures the images of the color inspection target 103 and the reference charts 106 arranged at the plurality of positions in an illumination environment in which the first light source 104 and the second light source 105 coexist to acquire an image (target image) of the color inspection target 103 and images (chart images) of the reference charts 106 arranged at the plurality of positions. The image capturing control unit 301 may also function as an acquisition unit that acquires the target image and the chart images that are obtained by performing image capturing in advance from the HDD 203 or the like.

The image acquisition unit 302 acquires a first light source reference image, which is an image acquired by capturing images of the reference charts 106 in advance in an illumination environment in which the second light source 105 is not present and the first light source 104 is present. Specifically, the image acquisition unit 302 performs processing of acquiring the first light source reference image, which includes the images of the reference charts 106 arranged at the plurality of positions under the first light source 104, as reference image acquisition processing. The reference image acquisition processing and the first light source reference image will be described in detail below.

The ratio deriving unit 303 derives a ratio between brightness of the first light source 104 and brightness of the second light source 105 at a position of the color inspection target 103 based on the first light source reference image and a reference image for both of the light sources. Ratio deriving processing to be executed by the ratio deriving unit 303 will be described in detail below.

The estimation unit 304 estimates an image of the color inspection target 103 when the image of the color inspection target 103 is captured under the first light source 104 based on the target image and the ratio derived by the ratio deriving unit 303. Image estimation processing to be executed by the estimation unit 304 will be described in detail below.

<Processing to Be Executed by Image Processing Apparatus of First Exemplary Embodiment>

Figure 4:
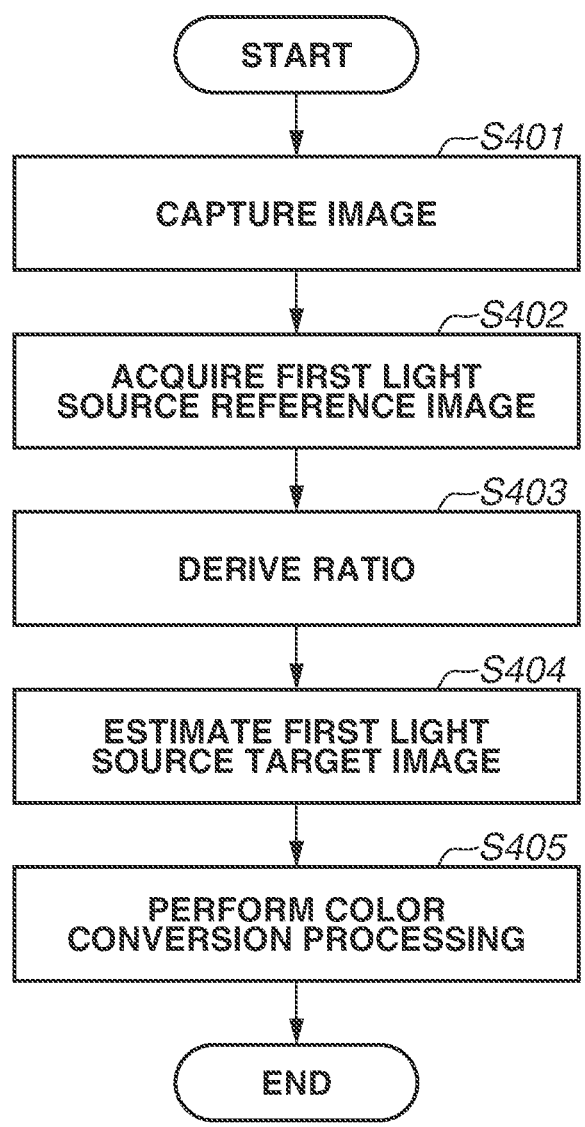
FIG. 4 is a flowchart illustrating processing to be executed by the image processing apparatus according to the first exemplary embodiment.

FIG. 4 is a flowchart illustrating processing to be executed by the CPU 201 of the image processing apparatus 102 in the functional blocks illustrated in FIG. 3. The processing to be executed by the image processing apparatus 102 will be described in detail below with reference to FIG. 4. The processing illustrated in the flowchart of FIG. 4 is started, for example, when a start instruction is input from a user via the input apparatus 206 and the instruction is received by the CPU 201.

First, in step S401, the image capturing control unit 301 controls the image capturing apparatus 205 to capture images of the color inspection target 103 and the reference charts 106 arranged at the plurality of positions and converts the images into data, thereby obtaining a captured image (including the target image and the chart images). In this case, the color inspection target 103 is irradiated with light from the first light source 104 and light from the second light source 105. The captured image is formed of a plurality of pixels, and each of the pixels holds three components, i.e., red (R), green (G), and blue (B) components. For example, if the user designates an area of any of the images of the reference charts 106 in the captured image via the input apparatus 206, the image capturing control unit 301 acquires the corresponding chart image from the captured image. Alternatively, the image capturing control unit 301 may acquire the chart images by performing processing of extracting areas of the images of the reference charts 106 from the captured image. Yet alternatively, the images of the color inspection target 103 and the reference charts 106 arranged at the plurality of positions may be captured separately. Subsequently, the image capturing control unit 301 stores the target image and the chart images in a storage unit such as the RAM 202 or the HDD 203.

Next, in step S402, the image acquisition unit 302 acquires the first light source reference image that is an image acquired by capturing an image of a reference chart 106 in advance in the illumination environment in which the first light source 104 is present. The reference chart 106 to be used in acquiring the first light source reference image is placed at the same position as the position of the color inspection target 103. In other words, the first light source reference image is acquired by capturing the image of the reference chart 106 in a state where the reference chart 106 is placed at the position where the color inspection target 103 is to be placed in an actual color inspection. The illumination environment in which the color inspection target 103 is irradiated with light from the first light source 104 can be implemented by capturing an image at night, for example, in a case where the second light source 105 is the sun. Alternatively, the illumination environment in which the first light source 104 is present may be implemented by shielding light from the second light source 105 with a curtain or the like.

If it is difficult to place the reference chart 106 at the position where the color inspection target 103 is to be placed in the actual color inspection, the first light source reference image may be generated from an image acquired by capturing the images of the reference charts 106 arranged at the plurality of positions that are spatially different from each other. For example, interpolation processing is performed using the image acquired by capturing the images of the reference charts 106 arranged at the plurality of positions to thereby generate an image corresponding to the image captured in the case where the reference chart 106 is placed at the position where the color inspection target 103 is to be placed in the actual color inspection. The generated image is used as the first light source reference image. As an interpolation processing method, for example, a known interpolation method such as bilinear interpolation can be used.

Figure 5:
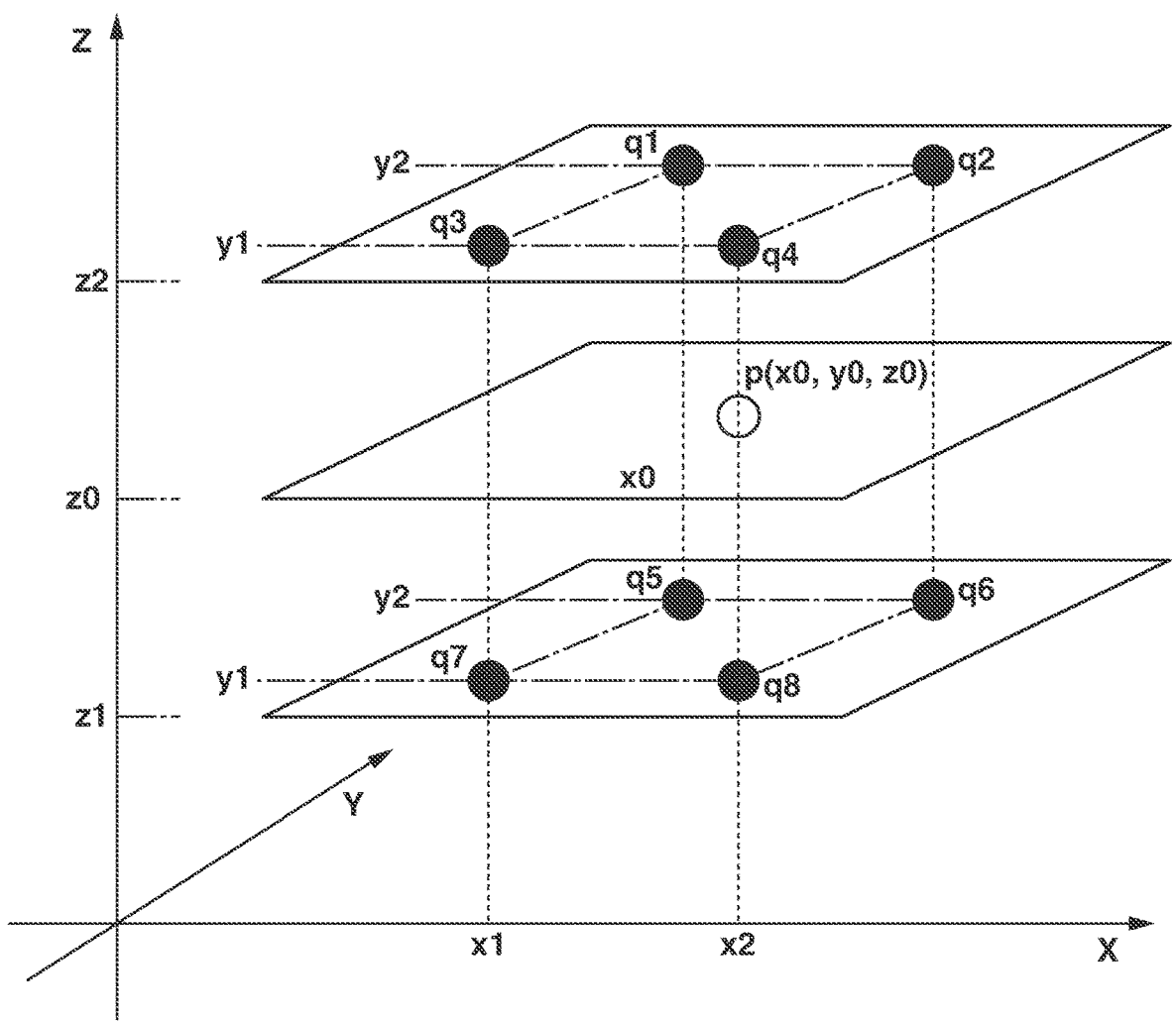
FIG. 5 is a graph illustrating an interpolation method.

The interpolation processing will be described with reference to FIG. 5. Referring to FIG. 5, a three-dimensional space is represented by xyz-coordinates. In FIG. 5, the position where the color inspection target 103 is placed is represented by coordinates p. The position represented by the coordinates p may be a central position of the color inspection target 103, or may be a position set by selecting a position at which color inspection is to be accurately performed in the color inspection target 103. The reference charts 106 are placed at positions corresponding to a plurality of coordinates q1 to q8 that surround the coordinates p. In FIG. 5, the x-coordinate of each of the coordinates q1, q3, q5, and q7 is represented by x1, and the x-coordinate of each of the coordinates q2, q4, q6, and q8 is represented by x2. The y-coordinate of each of the coordinates q1, q2, q5, and q6 is represented by y2, and the y-coordinate of each of the coordinates q3, q4, q7, and q8 is represented by y1. The z-coordinate of each of the coordinates q1 to q4 is represented by z2, and the z-coordinate of each of the coordinates q5 to q8 is represented by z1. RGB values of the pixels in the captured image at the coordinates q1, q2, . . . , and q8 are represented by $RGBq1$, $RGBq2$, . . . , and $RGBq8$, respectively. RGB values of the reference image are calculated by designating an area in the reference image and taking an average of pixel values in the area. When the coordinates p are expressed as (x0, y0, z0), $RGBp$, which represents RGB values obtained after the interpolation processing at the coordinates p, is calculated by Equation (1).

$$a1=(x0-x1)(y2-y0)(z2-z0)RGBq1$$

$$a2=(x2-x0)(y2-y0)(z2-z0)RGBq2$$

$$a3=(x0-x1)(y0-y1)(z2-z0)RGBq3$$

$$a4=(x2-x0)(y0-y1)(z2-z0)RGBq4$$

$$a5=(x0-x1)(y2-y0)(z0-z1)RGBq5$$

$$a6=(x2-x0)(y2-y0)(z0-z1)RGBq6$$

$$a7=(x0-x1)(y0-y1)(z0-z1)RGBq7$$

$$a8=(x2-x0)(y0-y1)(z0-z1)RGBq8$$

$$RGBp=(a1+a2+a3+a4+a5+a6+a7+a8)/((x2-x1)(y2-y1)(z2-z1)) \quad (1)$$

While the present exemplary embodiment illustrates an example where the bilinear interpolation is used, methods other than the bilinear interpolation may also be used. For example, another linear interpolation method such as triangular prism interpolation, and nonlinear interpolation such as spline interpolation may also be used. The RGB values obtained by the interpolation processing may be used in the first light source reference image, or a plurality of RGB values obtained by repeatedly performing the interpolation processing on a plurality of pixels in a certain area may be used in the first light source reference image.

The first light source reference image prepared in advance as described above is stored in the storage unit such as the HDD 203. In step S402, the image acquisition unit 302 acquires the first light source reference image by reading the stored first light source reference image.

Next, in step S403, the ratio deriving unit 303 derives the ratio between the brightness of the first light source 104 and the brightness of the second light source 105.

First, in the environment illuminated by both the first light source 104 and the second light source 105, the ratio deriving unit 303 performs interpolation processing to generate an image corresponding to the image in which the reference chart 106 placed at the same position as the color inspection target 103 is captured (hereinafter, referred to as the reference image for both of the light sources). In this case, the reference image for both of the light sources can be generated by a method similar to the interpolation processing described above with reference to step S402, for example, using the chart images acquired in step S401.

Next, the ratio deriving unit 303 calculates RGB values of the reference image for both of the light sources and RGB values of the first light source reference image acquired in step S402. These RGB values are calculated by, for example, designating a certain area in each of the images and taking an average of pixel values in the area.

Then, the ratio deriving unit 303 subtracts the RGB values of the first light source reference image from the RGB values of the reference image for both of the light sources in respective areas, thereby calculating RGB values of an image of the reference chart 106 under the second light source 105.

Then, the ratio deriving unit 303 derives a ratio between the RGB values of the image of the reference chart 106 under the second light source 105 and the RGB values of the first light source reference image as the ratio between the brightness of the first light source 104 and the brightness of the second light source 105.

Subsequently, in step S404, the estimation unit 304 estimates the image of the color inspection target 103 under the first light source 104 from the captured image obtained in step S401. In this case, the RGB values of the captured image obtained in step S401 include RGB components due to the first light source 104 and RGB components due to the second light source 105. The estimation unit 304 separates the RGB values of the captured image obtained in step S401 based on the ratio calculated in step S403, thereby separating the captured image obtained in step S401 into an image formed of the RGB components due to the first light source 104 and an image formed of the RGB components due to the second light source 105. In the present exemplary embodiment, the image that is separated from the captured image obtained in step S401 and is formed of the RGB components due to the first light source 104 is referred to as a first light source target image, and the image that is separated from the captured image obtained in step S401 and is formed of the RGB components due to the second light source 105 is referred to as a second light source target image.

Then, in step S405, the estimation unit 304 performs color conversion processing on each of the first light source target image and the second light source target image that are separated in step S404. In the present exemplary embodiment, a color conversion profile corresponding to the first light source 104 and a color conversion profile corresponding to the second light source 105 are prepared in advance and stored in the storage unit such as the HDD 203. The estimation unit 304 uses the color conversion profile corresponding to the first light source 104 to perform the color conversion processing on the first light source target image separated in step S404. Similarly, the estimation unit 304 uses the color conversion profile corresponding to the second light source 105 to perform the color conversion processing on the second light source target image. Then, the estimation unit 304 stores images after the color conversion processing in the storage unit such as the RAM 202 or the HDD 203.

In the present exemplary embodiment, the images after the color conversion processing that are stored in the storage unit are compared with the color inspection target 103, thereby color inspection processing is performed on the color inspection target 103. If it is possible to accurately perform the color inspection processing by visually checking colors under the first light source 104, the color conversion processing may be performed on the first light source target image, and the processing result may be stored.

The present exemplary embodiment illustrates an example where, in the above-described interpolation processing, RGB values are calculated by designating an area and taking the average of pixel values in the area. However, the method for calculating the RGB values is not limited to the example described above, and a method other than the above-described method may also be used. For example, a statistic other than an average value, such as a median, may be used, or RGB values of a representative pixel may be used. Alternatively, the processing according to the present exemplary embodiment may be performed on each pixel, and the processing may be repeatedly performed on all pixels in the designated area.

As described above, in the first exemplary embodiment, the image of the reference chart 106 at the position corresponding to the position where the color inspection target 103 is placed is obtained by interpolation or the like, and the ratio between the brightness of the first light source 104 and the brightness of the second light source 105 is obtained based on the interpolated image and the image of the reference chart 106 captured in advance under the first light source 104, thereby estimating at least the first light source target image. In other words, in the first exemplary embodiment, there is no need to switch the illumination light or to replace a color inspection object with the reference chart 106 every time image capturing is performed, which saves time and labor in the color conversion processing in an environment in which illumination conditions vary spatially and temporally.

While the first exemplary embodiment illustrates an example where the first light source reference image is obtained in advance, a second exemplary embodiment illustrates an example where the first light source reference image is estimated by acquiring a second light source reference image instead of the first light source reference image. A configuration of the color inspection system and a hardware configuration of the image processing apparatus 102 according to the second exemplary embodiment are similar to those of the first exemplary embodiment, and thus illustrations and descriptions thereof are omitted. Differences between the second exemplary embodiment and the first exemplary embodiment will be mainly described below.

<Functional Configuration of Image Processing Apparatus of Second Exemplary Embodiment>

Figure 6:
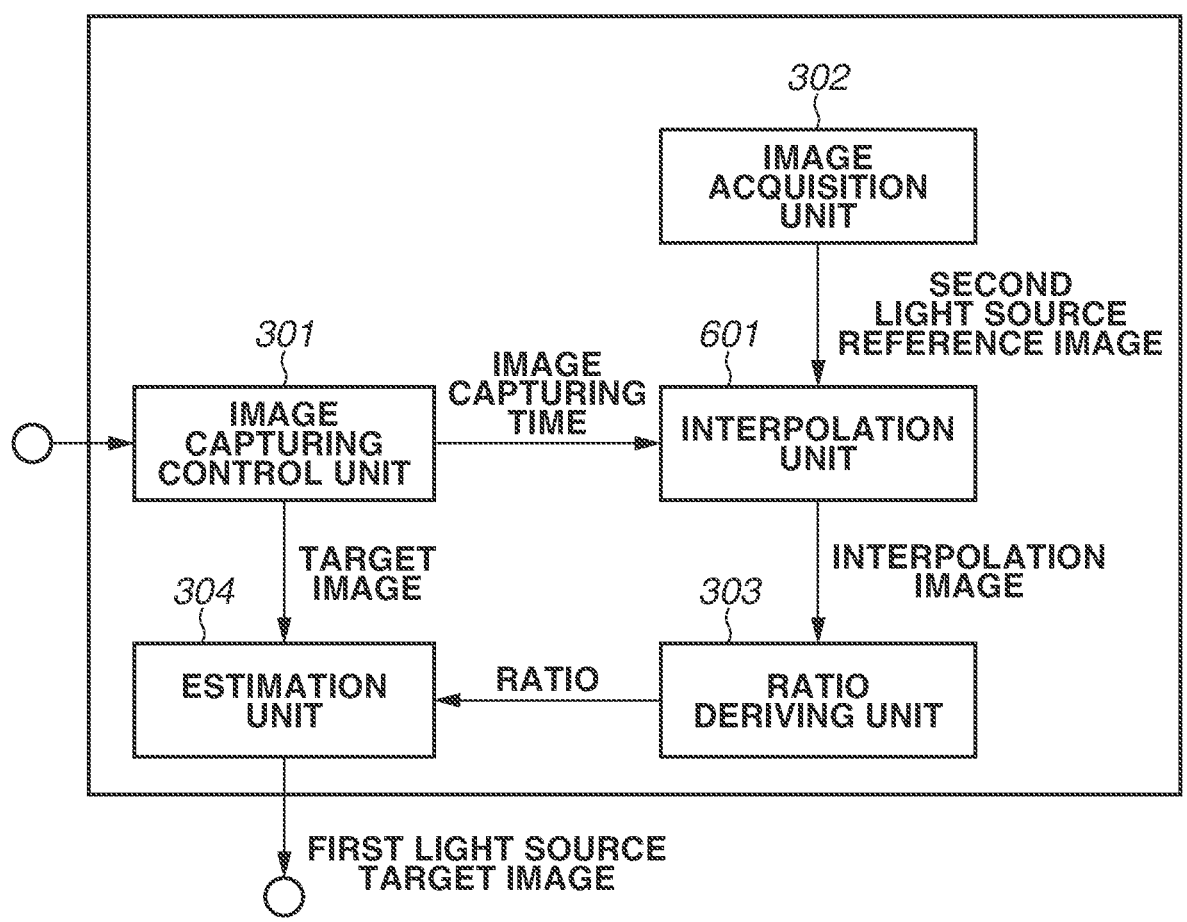
FIG. 6 is a block diagram illustrating a functional configuration of an image processing apparatus according to a second exemplary embodiment.

FIG. 6 is a functional block diagram illustrating a functional configuration formed when the CPU 201 of the image processing apparatus 102 according to the second exemplary embodiment executes the image processing application. In the second exemplary embodiment, the CPU 201 uses the RAM 202 as a work memory to read a program stored in the HDD 203 and executes the program, thereby implementing a function of each processing unit illustrated in FIG. 6. In the second exemplary embodiment, similar to the first exemplary embodiment described above, the processing to be described below is not necessarily executed entirely by the CPU 201, and the image processing apparatus 102 may be configured so that part or all of the processing is executed by one or more processing circuits other than the CPU 201.

As illustrated in FIG. 6, in the second exemplary embodiment, the CPU 201 executes the image processing application to perform processing corresponding to each of the image capturing control unit 301, the image acquisition unit 302, the ratio deriving unit 303, and the estimation unit 304.

The image capturing control unit 301 controls the image capturing apparatus 205 to capture images of the color inspection target 103 and the reference charts 106 arranged at the plurality of positions. In the second exemplary embodiment, the image capturing control unit 301 acquires an image capturing time T.

The image acquisition unit 302 acquires the second light source reference image that is obtained by capturing images of the reference charts 106 in advance in the environment illuminated with light from the second light source 105 and that is stored.

An interpolation unit 601 generates an interpolation image corresponding to an image obtained by capturing images of the reference charts 106 at the image capturing time T under the second light source 105. Interpolation processing to be executed by the interpolation unit 601 will be described in detail below. The ratio deriving unit 303 obtains the ratio between the brightness of the first light source 104 and the brightness of the second light source 105.

The estimation unit 304 estimates the first light source target image.

<Processing to Be Executed by Image Processing Apparatus of Second Exemplary Embodiment>

FIG. 7 is a flowchart illustrating processing to be executed by the CPU 201 of the image processing apparatus 102 according to the second exemplary embodiment in the functional blocks illustrated in FIG. 6. The processing illustrated in the flowchart of FIG. 7 is started, for example, when an instruction is input from the user via the input apparatus 206 and the instruction is received by the CPU 201.

First, in step S701, the image capturing control unit 301 controls the image capturing apparatus 101 to capture an image of the color inspection target 103 and converts the image into data to obtain a target image. In this case, the color inspection target 103 is irradiated with light from the first light source 104 and light from the second light source 105. The target image is formed of a plurality of pixels, and each of the pixels holds three components, i.e., the RGB components. The image capturing control unit 301 measures the image capturing time T, and stores the target image and the image capturing time T in the storage unit such as the RAM 202 or the HDD 203.

Next, in step S702, the image acquisition unit 302 acquires the second light source reference image obtained by capturing images of the plurality of reference charts 106 under the second light source 105 at an image capturing time different from the image capturing time T, and also acquires the image capturing time. If the first light source 104 is an LED, images of the reference charts 106 captured under the second light source 105 at the image capturing time T can be acquired by capturing the image in a state where the LED is turned off. However, in this method, second light source reference images that vary depending on the image capturing time due to variation in the second light source 105 such as the sun, which varies with the time, are acquired. This may necessitate an operation to turn off the LED every time the color inspection processing is carried out. In this case, the operation may adversely affect other inspection processes, or may require an aging time for the LED. Thus, in the second exemplary embodiment, the second light source reference images are acquired in advance at a plurality of times different from the image capturing time T, and a second light source reference image corresponding to a time between the plurality of times is acquired by interpolation.

The second light source reference images captured in advance at the plurality of times different from each other and image capturing times thereof are stored in the storage unit such as the HDD 203. As the plurality of different times, for example, image capturing may be performed every hour, and information about the times is stored. Thus, in step S702, the image acquisition unit 302 selects the second light source reference image to be used from among the stored second light source reference images based on the image capturing time T acquired in step S701, and reads the selected second light source reference image and the image capturing time thereof.

For example, among the image capturing times of the second light source reference images captured in advance, an image capturing time that is on the day of the image capturing time T and that is before the image capturing time T and is the closest to the image capturing time T is referred to as an image capturing time Ta, and an image capturing time that is on the day of the image capturing time T and that is after the image capturing time T and is the closest to the image capturing time T is referred to as an image capturing time Tb. The times T, Ta, and Tb each have a time value. For example, the times T, Ta, and Tb have no date information, and in the case of 11:30:44, the times T, Ta, or Tb has a value "11×60+30×60+44=41444 seconds". The image acquisition unit 302 reads the image capturing time Ta and the image capturing time Tb, and the second light source reference images corresponding to the image capturing time Ta and the image capturing time Tb from the storage unit such as the HDD 203.

Next, in step S703, the interpolation unit 601 obtains the interpolation image, which is the image corresponding to images of the reference charts 106 at the image capturing time T under the second light source 105 by performing interpolation processing using, for example, a weighted average based on the time. The interpolation processing is expressed by Equation (2).

$$\text{Interpolation image} = ((Tb-T)/(Tb-Ta))RGBb + ((T-Ta)/(Tb-Ta))RGBa \quad (2)$$

In Equation (2), RGBa represents a set of RGB values obtained from the images of the reference charts 106 under the second light source 105 at the image capturing time Ta obtained in step S702, and RGBb represents a set of RBG values obtained from the images of the reference charts 106 under the second light source 105 at the image capturing time Tb. These sets of RGB values are obtained by, for example, designating an area in each of the images of the plurality of reference charts 106 included in each of the second light source reference images, calculating an average value of the RGB values in the area, and setting out the calculated values.

In this case, if the image capturing time Tb is on the same day and after the image capturing time T, the color inspection result can be obtained after the image capturing time Tb. Thus, in order to obtain the color inspection result in real time, a set of RGB values obtained from images of the reference charts 106 captured on a day prior to the image capturing time Tb may be used as RGBb. It can be expected that, if the images are captured on a day in a season and weather conditions similar to those at the image capturing time Tb, a set of RGB values similar to those obtained at the image capturing time Tb can be obtained. However, if the images are captured on a day in a season and weather conditions different from those at the image capturing time Tb, the RGB values can be greatly different from those obtained at the image capturing time Tb. Thus, it may be desirable to select the image capturing time Tb on a day in the similar season and similar weather conditions. Alternatively, a set of RGB values obtained from images of the reference charts 106 captured at the image capturing time Tb on a day after the image capturing time T may be used as RGBb. Similarly, a set of RGB values obtained from images of the reference charts 106 captured at the image capturing time Ta on a day different from the day of the image capturing time T may be used as RGBa.

The interpolation image may be obtained by using sets of RGB values of the second light source reference images captured at the image capturing time T on different days.

Alternatively, the interpolation image may be obtained by predicting an increase or decrease in the RGB values with time, and by increasing or decreasing values of RGBc representing a set of RGB values obtained from images of the reference charts 106 captured at a time Tc based on the prediction. A degree of variation in the RGB values varies with time. For example, when a window, the sun, and the reference charts 106 are aligned, the RGB values increase, while in other cases, the RGB values decrease. The variation may be obtained by preliminarily measuring the increase or decrease in the RGB values with time and increasing or decreasing the values of RGBc by the variation.

In the present exemplary embodiment, to simplify the explanation, the image capturing time is calculated on the second time scale, but instead, the image capturing time may be obtained in a different data format as long as similar processing can be performed. For example, the image capturing time may be calculated using the units of hours and minutes, or the image capturing time may have date information.

Next, in step S704, the ratio deriving unit 303 obtains the ratio between the brightness of the first light source 104 and the brightness of the second light source 105. First, the ratio deriving unit 303 generates, by interpolation, RGB values that are obtained when the reference chart 106 is placed at the same position as the color inspection target 103 and an image of the reference chart 106 is captured under the second light source 105. As the interpolation method, for example, an interpolation method similar to the method of generating the first light source reference image in step S402 may be used for the interpolation image obtained in step S702.

Further, the ratio deriving unit 303 acquires RGB values that are obtained by capturing the image of the reference chart 106 when the reference chart 106 is placed at the same position as the color inspection target 103 under the first light source 104t. The RGB values can be calculated by, for example, preliminarily storing an image of the reference chart 106 captured at night, for example, in the storage unit such as the HDD 203, reading the image, designating an area in the reference chart 106 in the image, and taking an average of RGB values in the area. The ratio deriving unit 303 derives the ratio between the RGB values of the first light source reference image and the RGB values of the second light source reference image. Then, the processing proceeds to step S404.

Accordingly, in the second exemplary embodiment, the image of the reference chart 106 at the image capturing time under the second light source 105 is obtained by interpolation processing. Then, the ratio between the RGB values obtained under the first light source 104 and the RGB values obtained under the second light source 105 is obtained using the image obtained by the interpolation processing, and then captured images under the respective light sources are estimated. Accordingly, in the second exemplary embodiment, there is no need to switch the illumination light every time image capturing is performed, which saves time and labor in the color conversion processing in the environment in which the illumination conditions vary spatially and temporally.

Among the processing units of the functional blocks described above in the first and second exemplary embodiments, the ratio deriving unit 303, the estimation unit 304, and the interpolation unit 601 may be processed using a trained model obtained by machine learning. In this case, for example, a plurality of combinations of input data and output data to be input to and output from the processing units is prepared as training data, and knowledge is acquired from the training data by machine learning to generate a trained model that outputs output data corresponding to input data as a result of processing based on the acquired knowledge. The trained model can be configured using, for example, a neural network model. The trained model is used as a program for performing processing similar to that of each of the processing units, and operates in cooperation with a CPU or a graphics processing unit (GPU) to thereby perform processing corresponding to each of the processing units. The trained model may be updated after certain processing, as needed.

While the above-described exemplary embodiments illustrate an example where an LED and the sun are used as light sources, the two light sources are not limited to these examples. The present exemplary embodiment can also be applied to a case where other light sources are used, or three or more light sources are present. For example, the present exemplary embodiment can also be applied to a case where two or more first light sources 104 are present, or two or more second light sources 105 are present.

In the disclosure, it is possible to save time and labor in the color conversion processing in the environment in which temporal or spatial illumination conditions vary.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-085393, filed May 14, 2020, which is hereby incorporated by reference herein in its entirety.

What is claimed is:

1. An apparatus comprising:
   at least one memory that stores instructions; and
   at least one processor that executes the instructions to perform:
   acquiring a target image and a first reference image in an environment in which a first light source and a second light source having temporally and spatially varying characteristics coexist, the target image being obtained by capturing an image of a target object, the first reference image being obtained by capturing images of reference charts arranged at a plurality of positions;
   acquiring a second reference image obtained by capturing images of the reference charts arranged at the plurality of positions under the first light source;
   deriving a ratio between brightness of the first light source and brightness of the second light source at a position of the target object based on the first reference image and the second reference image; and
   estimating, based on the target image and the ratio, an image of the target object in a case where the image of the target object is captured under the first light source.

2. The apparatus according to claim 1, wherein the estimating generates the image of the target object by interpolation processing based on the positions of the reference charts.

3. An apparatus comprising:
   at least one memory that stores instructions; and
   at least one processor that executes the instructions to perform:

first acquiring a target image, a first reference image, and an image capturing time in an environment in which a first light source and a second light source having temporally and spatially varying characteristics coexist, the target image being obtained by capturing an image of a target object, the first reference image being obtained by capturing images of reference charts arranged at a plurality of positions;

second acquiring a second reference image obtained by capturing images of the reference charts arranged at the plurality of positions under the second light source at a time different from the image capturing time;

performing interpolation processing using the second reference image to generate an interpolation image corresponding to images of the reference charts under the second light source at the image capturing time;

deriving a ratio between brightness of the first light source and brightness of the second light source at a position of the target object based on the first reference image and the interpolation image; and estimating, based on the target image and the ratio, an image of the target object in a case where the image of the target object is captured under the first light source.

4. The apparatus according to claim 3,
wherein the second acquiring acquires a plurality of second reference images at different times, and
wherein the performing performs the interpolation processing on the plurality of second reference images acquired at the different times by using a weighted average of pixel values based on time.

5. The apparatus according to claim 3,
wherein the second acquiring acquires a second reference image captured prior to the image capturing time, and
wherein the performing performs the interpolation processing by increasing or decreasing a pixel value of the second reference image based on time.

6. The apparatus according to claim 3,
wherein the second acquiring acquires two second reference images including a second reference image captured at a time on a day of the image capturing time and before the image capturing time, and a second reference image captured at a time on a day before the day of the image capturing time and after the image capturing time, and
wherein the interpolation unit performs the interpolation processing on the two second reference images by using a weighted average of pixel values based on time.

7. The apparatus according to claim 1, wherein the reference charts are placed at a plurality of stereoscopically different positions.

8. The apparatus according to claim 1, wherein the first light source is an artificial light source and the second light source is the sun.

9. The apparatus according to claim 8, wherein the first light source is a light-emitting diode (LED).

10. The apparatus according to claim 1, wherein the second reference image is an image obtained by capturing images of the reference charts in an environment in which the first light source is included and the second light source is not included.

11. The apparatus according to claim 1, wherein the estimating estimates the image of the target object in a case where the image of the target object is captured in an environment in which the first light source is included and the second light source is not included.

12. A method to be executed by an apparatus, the method comprising:

acquiring a target image and a first reference image in an environment in which a first light source and a second light source having temporally and spatially varying characteristics coexist, the target image being obtained by capturing an image of a target object, the first reference image being obtained by capturing images of reference charts arranged at a plurality of positions;

acquiring a second reference image obtained by capturing images of the reference charts arranged at the plurality of positions under the first light source;

deriving a ratio between brightness of the first light source and brightness of the second light source at a position of the target object based on the first reference image and the second reference image; and estimating, based on the target image and the ratio, an image of the target object in a case where the image of the target object is captured under the first light source.

13. The method according to claim 12, wherein the estimating generates the image of the target object by interpolation processing based on the positions of the reference charts.

14. The method according to claim 12,
wherein the reference charts are placed at a plurality of stereoscopically different positions, and
wherein the first light source is an artificial light source and the second light source is the sun.

15. The method according to claim 12, wherein the estimating estimates the image of the target object in a case where the image of the target object is captured in an environment in which the first light source is included and the second light source is not included.

16. A method of an apparatus comprising:
acquiring a target image, a first reference image, and an image capturing time in an environment in which a first light source and a second light source having temporally and spatially varying characteristics coexist, the target image being obtained by capturing an image of a target object, the first reference image being obtained by capturing images of reference charts arranged at a plurality of positions;

acquiring a second reference image obtained by capturing images of the reference charts arranged at the plurality of positions under the second light source at a time different from the image capturing time;

performing interpolation processing using the second reference image to generate an interpolation image corresponding to images of the reference charts under the second light source at the image capturing time;

deriving a ratio between brightness of the first light source and brightness of the second light source at a position of the target object based on the first reference image and the interpolation image; and estimating, based on the target image and the ratio, an image of the target object in a case where the image of the target object is captured under the first light source.

17. A non-transitory computer-readable storage medium storing instructions that, when executed by a computer, cause the computer to perform a method comprising:

acquiring a target image and a first reference image in an environment in which a first light source and a second light source having temporally and spatially varying characteristics coexist, the target image being obtained by capturing an image of a target object, the first reference image being obtained by capturing images of reference charts arranged at a plurality of positions;

acquiring a second reference image obtained by capturing images of the reference charts arranged at the plurality of positions under the first light source;

deriving a ratio between brightness of the first light source and brightness of the second light source at a position of the target object based on the first reference image and the second reference image; and estimating, based on the target image and the ratio, an image of the target object in a case where the image of the target object is captured under the first light source.

18. The non-transitory computer-readable storage medium according to claim 17, wherein the estimating generates the image of the target object by interpolation processing based on the positions of the reference charts.

19. The non-transitory computer-readable storage medium according to claim 17,
wherein the reference charts are placed at a plurality of stereoscopically different positions, and
wherein the first light source is an artificial light source and the second light source is the sun.

20. The method according to claim 17, wherein the estimating estimates the image of the target object in a case where the image of the target object is captured in an environment in which the first light source is included and the second light source is not included.

* * * * *